Figure 1:
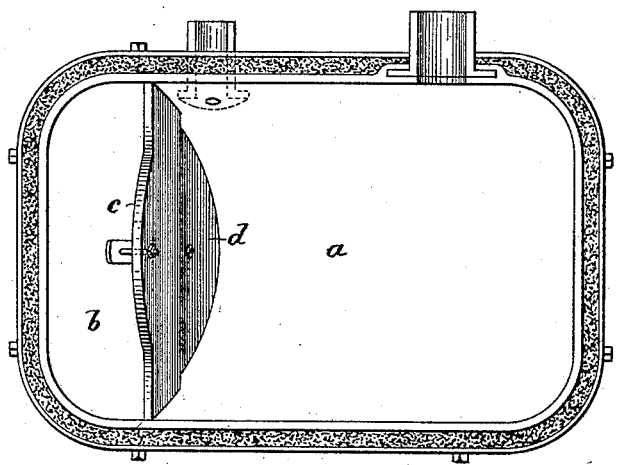

(No Model.) 4 Sheets—Sheet 1.

N. R. WILSON.
PROCESS OF SEPARATING LEAD BULLION FROM MATTE AND SLAG.

No. 416,086. Patented Nov. 26, 1889.

(No Model.) 4 Sheets—Sheet 2.
N. R. WILSON.
PROCESS OF SEPARATING LEAD BULLION FROM MATTE AND SLAG.
No. 416,086. Patented Nov. 26, 1889.
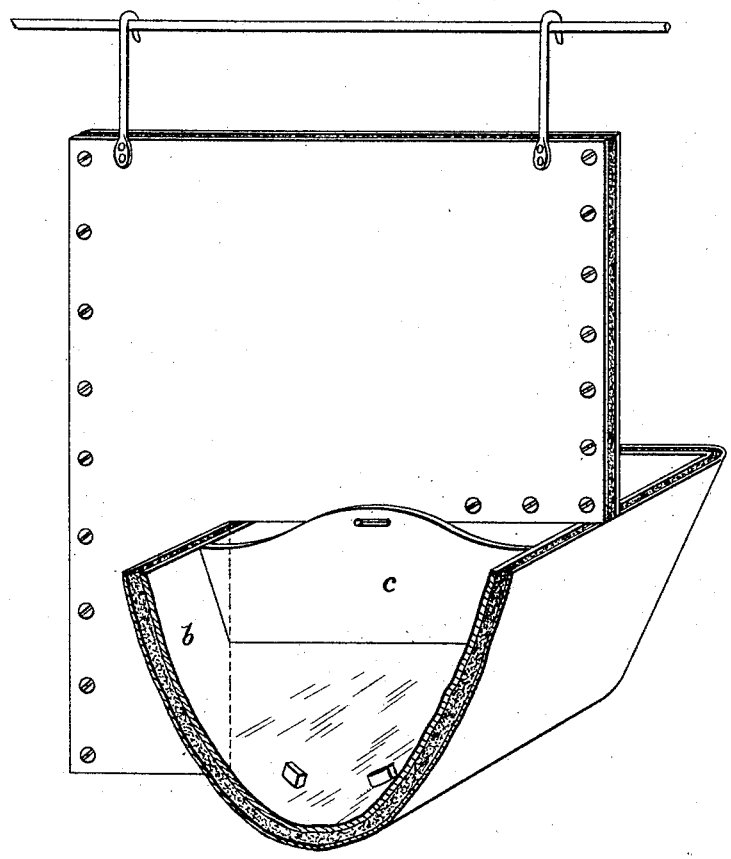
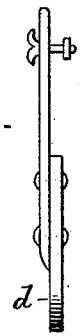
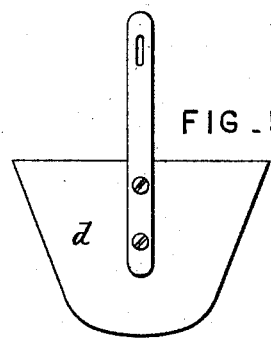
Attest
Geo. T. Smallwood.
F. A. Hopkins
Inventor
Newton R. Wilson
by Knight Bro. Attys (No Model.) 4 Sheets—Sheet 3.
N. R. WILSON.
PROCESS OF SEPARATING LEAD BULLION FROM MATTE AND SLAG.

No. 416,086. Patented Nov. 26, 1889.

Attest:
Geo. T. Smallwood.
F. A. Hopkins.

Inventor
Newton R. Wilson
by Knight Bros.
Attys.

(No Model.) 4 Sheets—Sheet 4.
N. R. WILSON.
PROCESS OF SEPARATING LEAD BULLION FROM MATTE AND SLAG.
No. 416,086. Patented Nov. 26, 1889.

Attest.
Geo. T. Smallwood.
F. A. Hopkins.

Inventor
Nelson R. Wilson
by Knight Bros.
Atty's

UNITED STATES PATENT OFFICE.

NEWTON R. WILSON, OF ST. LOUIS, MISSOURI.

PROCESS OF SEPARATING LEAD BULLION FROM MATTE AND SLAG.

SPECIFICATION forming part of Letters Patent No. 416,086, dated November 26, 1889.

Application filed September 17, 1888. Serial No. 285,625. (No specimens.)

*To all whom it may concern:*

Be it known that I, NEWTON R. WILSON, a citizen of the United States, formerly residing at Socorro, in the Territory of New Mexico, but now of St. Louis, in the State of Missouri, have invented a new and useful Process of Separating Lead Bullion from Matte and Slag, of which the following is a specification.

It is the common practice in separating lead bullion from its slag and matte to tap the molten metal from the smelter into a crucible divided into two compartments by a partition, in the lower part of which is an opening through which the melted lead flows from the first compartment into the second, from which it is dipped or tapped out. The object of this is to separate the pure lead from the matte and slag, which, being of less specific gravity, float on top of the molten mass. It is found by experience that the running of the pure lead in this manner from the bottom of the first compartment of the crucible into the second results in leaving behind not only the matte and slag, which it is desired to separate from the lead, but also the alloys of lead with copper, zinc, &c., which, by reason of their less specific gravity than the pure lead, occupy a stratum above the pure lead and between it and the matte. Even a small percentage of copper or zinc in the alloys of lead above referred to, which occupy a higher stratum by reason of their less specific gravity, renders such alloys much less fusible than the pure lead, while it does not impair the value of the bullion so as to necessitate the exclusion of such alloys from the mass which is to be dipped out for use; but the comparative infusibility of such alloys renders them much less tractable and at the ordinary temperature of lead-crucibles less fluid than the pure lead beneath. This stratum of alloy, which occupies a level between the bottom stratum of pure lead and the upper stratum of slag and matte, is commonly known as "mushy lead," and will not flow freely through a contracted opening, but in the common mode of passing the fluid lead from the first to the second compartment of the crucible through a small hole or an opening much below the level of the lead is kept back in the first compartment, where, by reason of its comparative infusibility, it chills and gradually accumulates or cakes on the sides of the crucible, necessitating the frequent removal of the crucible to be replaced by a clean one, while the metal which has chilled and caked upon the sides of the first is laboriously chipped off. The same difficulty of the chilling and caking of the mushy lead in the crucible exists in what is commonly known as the "siphon-tap furnace," in which the crucible which contains the melted mass is provided with an upwardly-inclined passage communicating with the bottom of the crucible and conducting the fluid lead therefrom to a lead-well at or near the height or level of the lead in the crucible, from which well the melted lead is dipped out for use.

It has been sought to obviate the difficulty of the chilling and caking of the mushy lead which is left behind in the crucible of the siphon-tap furnace or in the slag-compartment of the ordinary partitioned fore-hearth by an intermittent process, which consists in doing away with a partition altogether and running the melted matter at intervals from the furnace into a simple receptacle, allowing the slag and matte to solidify, and then lifting the solidified cake from the bath of lead on which it rests by means of a bent iron rod inserted in the center of the cake of slag and matte while it was still liquid. The lead and lead alloys may then be dipped or tapped out. The great disadvantage of this process is, that it is intermittent, and hence slow, tedious, and laborious.

In carrying out my process I prefer to employ one of the forms of crucibles which are represented in the accompanying drawings, in which—

Figure 2:
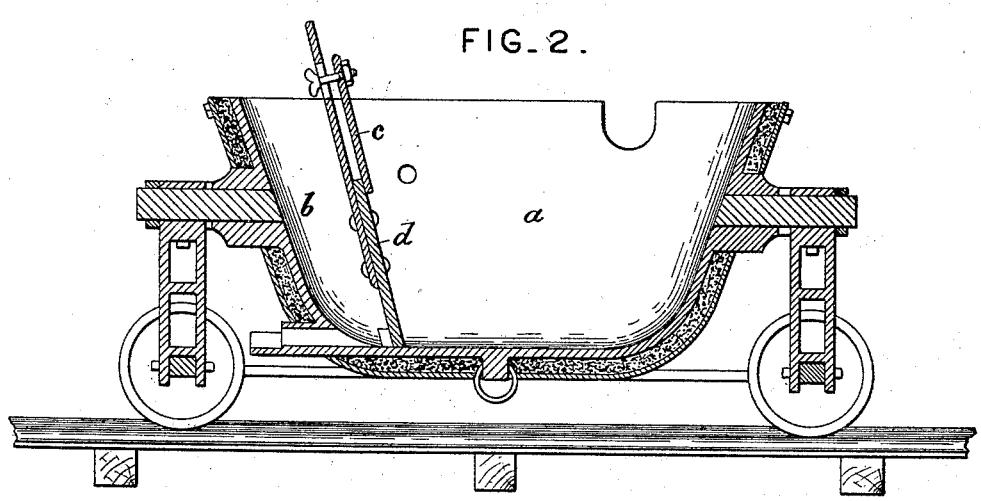
Figure 6:
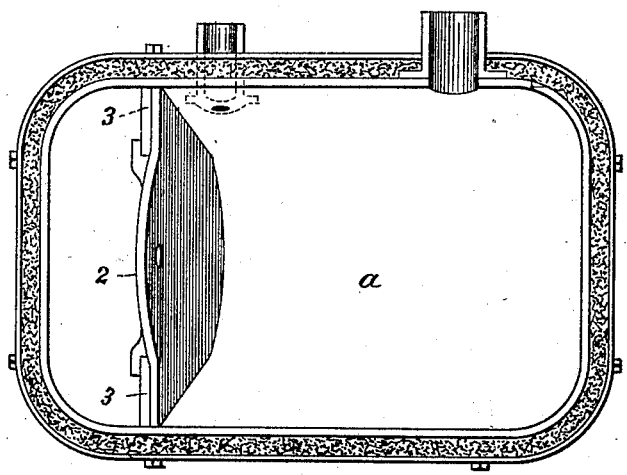
Figure 7:
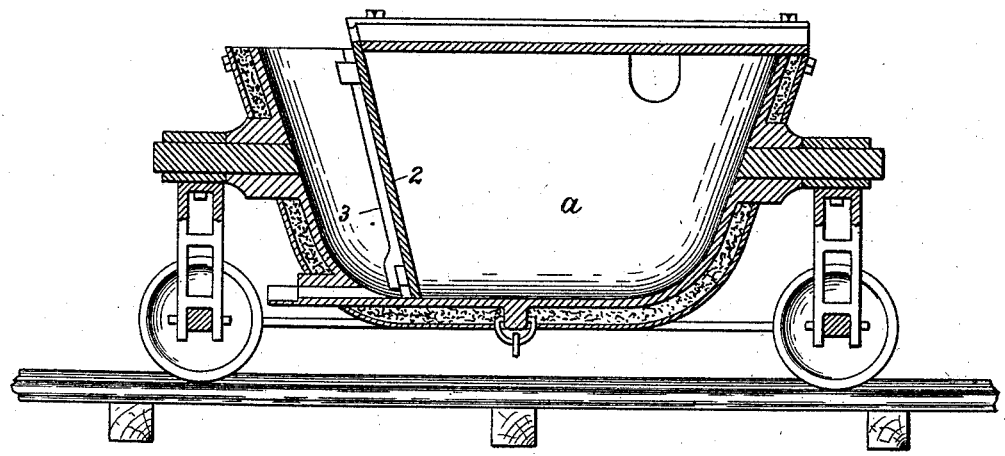
Figure 8:
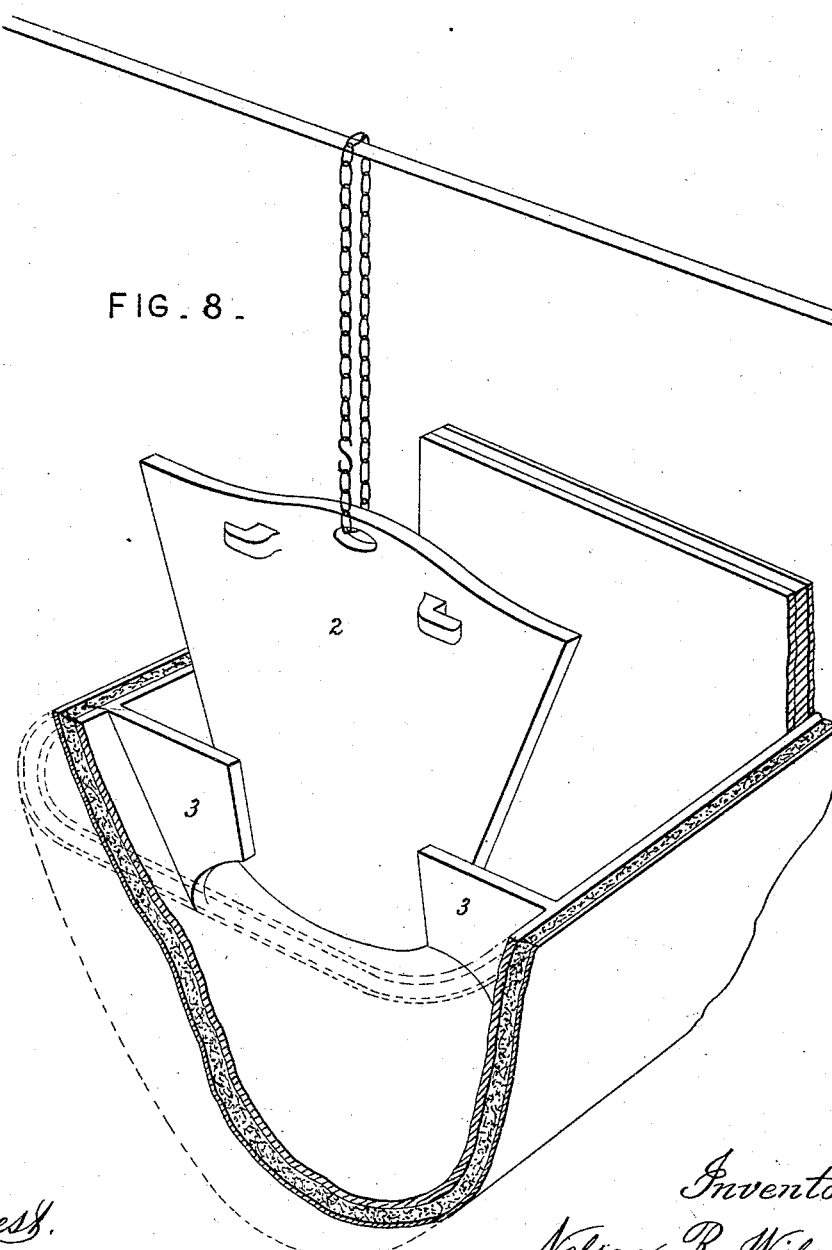

Figure 1 is a plan of my crucible. Fig. 2 is a vertical longitudinal section of the same mounted upon a truck. Fig. 3 is a perspective view of the crucible having a screen suspended across it. Fig. 4 is an edge view of the gate. Fig. 5 is a face view of the same. Figs. 6 and 7 are views similar to Figs. 1 and 2, but of a modification; and Fig. 8 is a perspective view of a crucible, showing it provided with a sliding partition suspended from a bar.

To obviate the difficulties above referred to my improved process consists in continuously drawing off the lead and lead alloys from the surface of the bath, where the mushy alloys accumulate, instead of drawing off the pure lead from the bottom and leaving the mushy alloys to solidify in the crucible or fore-hearth, as is commonly done in the siphon-tap furnace and in the ordinary fore-hearth.

In carrying out my invention I sometimes employ a partitioned fore-hearth, Figs. 1, 2, and 3, so constructed that while the slag and matte are retained behind in the first compartment $a$ the entire body of the fluid lead and alloys or mushy lead is allowed to pass together to a second compartment $b$ under a partition $c$, having a horizontal lower edge extending completely across the fore-hearth from side to side at or about the level of the lead which it is desired to dip out for use. In conjunction with this partition, which may be movable or stationary, I employ a movable gate $d$ to close the passage until a sufficient body of molten metal has accumulated in the first compartment to raise the level of the melted lead to about the height of the bottom of the partition, after which the gate is lifted or removed to permit the flow, as before described, and commence the continuous separating process. The form which I have just referred to is also shown and fully described in my application, Serial No. 282,722, filed August 14, 1888; or instead of this form I may employ, in some cases, the form shown in my application, Serial No. 261,315, filed January 19, 1888, which is provided with a sliding partition 2, Figs. 6, 7, and 8, which is lifted bodily to the requisite height to permit the passage of the molten metal beneath it into the second compartment and suspended by means of a chain $2^a$ to a bar, as shown, and in order to prevent the passage of the surface slag or matte around the sides of this movable partition, which is made in taper form to fit the downwardly-converging sides of the crucible, I employ stationary wings 3 3 to close the space between the sides of the crucible and the partition above the level of the molten lead.

While my continuous process is in operation the passage of the higher stratum of mushy lead beneath the horizontal lower edge of the partition is assisted by means of a rabble or other tool inserted in the second or dipping chamber and beneath the bottom of the partition, by means of which the mushy lead is kept constantly stirred up, so as to cause it to pass with the pure lead into the second compartment, from the surface of which the bullion is dipped, thus preventing accumulation of the mushy lead or alloy in the crucible.

I am aware that it is old and common to employ movable partitions in metallurgic crucibles of various kinds, and that it is common to tap molten metal through contracted openings or holes at various heights for drawing off a particular quality of metal; but it will be understood from the above description of my improved process that the object and result of my invention could not be carried out by conducting the fluid lead through a contracted opening either at the bottom of the partition or at a higher level, but only by providing a free passage extending substantially across the crucible from side to side beneath a partition having a substantially horizontal lower edge at or about the level of the molten lead, keeping the mushy lead stirred or agitated, so as to cause it to pass constantly with the fluid lead beneath the partition, while the matte and slag remain behind, and dipping from the surface of the mass in the second compartment, so as to prevent any accumulation or caking of the mushy lead in either compartment of the crucible. In the absence of these conditions the lagging behind and chilling and caking of the comparatively infusible, and therefore sluggish, alloys are unavoidable, and result in the necessity of removing and changing the crucibles every few hours, whereas with my process the operation is carried on successfully and continuously for an indefinite period.

Having thus described my invention, what I claim as new therein, and desire to secure by Letters Patent, is—

The process of separating lead bullion from matte and slag, which consists in tapping the molten metal from the furnace into a partitioned fore-hearth, continuously drawing off from the surface of the accumulated lead in the fore-hearth the lead and lead alloys beneath the horizontal lower edge of the partition, keeping the alloy or mushy lead stirred or agitated to cause it to pass with the pure lead, while the superposed matte and slag are kept back by said partition, and dipping or tapping the mixed lead and alloy from the surface of the bath in the second compartment for use, as explained.

NEWTON R. WILSON.

Witnesses:
OCTAVIUS KNIGHT,
H. S. KNIGHT.